(12) United States Patent
Hollatz

(10) Patent No.: US 7,599,350 B2
(45) Date of Patent: Oct. 6, 2009

(54) PACKET PRIORITIZING VOICE OVER PACKET NETWORK PHONE AND SYSTEM

(76) Inventor: Michael Hollatz, 10415 Fair La., Huntley, IL (US) 60142

( * ) Notice: Subject to any disclaimer, the term of this patent is extended or adjusted under 35 U.S.C. 154(b) by 766 days.

(21) Appl. No.: 09/846,544

(22) Filed: May 1, 2001

(65) Prior Publication Data

US 2003/0123430 A1    Jul. 3, 2003

(51) Int. Cl.
*H04L 12/66* (2006.01)
(52) U.S. Cl. .................... 370/352; 370/401
(58) Field of Classification Search ........... 370/352, 370/354, 356, 392, 395.4, 431, 395.1, 353, 370/355, 401
See application file for complete search history.

(56) References Cited

U.S. PATENT DOCUMENTS

| | | | |
|---|---|---|---|
| 4,100,377 A * | 7/1978 | Flanagan | 370/435 |
| 5,018,136 A | 5/1991 | Gollub | 370/60.1 |
| 5,453,987 A * | 9/1995 | Tran | 370/447 |
| 5,555,179 A | 9/1996 | Koyama et al. | |
| 5,765,033 A | 6/1998 | Miloslavsky | |
| 5,926,539 A | 7/1999 | Shtivelman | |
| 5,940,479 A | 8/1999 | Guy et al. | 379/93.01 |
| 5,943,319 A | 8/1999 | Fraser | 370/259 |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,035,314 A | 3/2000 | Henderson | 455/556 |
| 6,044,145 A | 3/2000 | Kelly et al. | |
| 6,044,368 A | 3/2000 | Powers | |
| 6,067,357 A | 5/2000 | Kishinsky et al. | |
| 6,081,720 A * | 6/2000 | Sampson | 455/450 |
| 6,097,793 A | 8/2000 | Jändel | 379/93.23 |
| 6,108,711 A | 8/2000 | Beck et al. | |
| 6,138,139 A | 10/2000 | Beck et al. | |
| 6,141,341 A | 10/2000 | Jones et al. | 370/352 |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |

(Continued)

OTHER PUBLICATIONS

Witowsky, W.E., "IP Telephone Design and Implementation Issues", Telogy Networks, Inc., pp. 1-10, Jul. 31, 1998.

(Continued)

*Primary Examiner*—Ricky Ngo
*Assistant Examiner*—Christine Ng
(74) *Attorney, Agent, or Firm*—Husch Blackwell Sanders Welsh & Katz

(57) ABSTRACT

Disclosed is a method for processing data packets exchanged over a packet network having data packets and voice packets. The method includes receiving data packets from a data processing device and determining whether the data packets need to be divided into smaller data packets. If the data packets need to be divided, then dividing the data packets into divided data packets and interspersing the divided data packets among the voice packets. In addition, the method includes sending the data packets, including the smaller data packets if divided, and the voice packets to a communications network. In one embodiment, data packets to and from the voice packets have a higher priority than the data packets.

59 Claims, 3 Drawing Sheets

U.S. PATENT DOCUMENTS

| | | | |
|---|---|---|---|
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,504,913 B1 * | 1/2003 | Patterson et al. | 379/88.08 |
| 6,639,915 B1 * | 10/2003 | Tsztoo et al. | 370/392 |
| 6,697,358 B2 * | 2/2004 | Bernstein | 370/352 |
| 6,707,821 B1 * | 3/2004 | Shaffer et al. | 370/395.4 |
| 6,732,156 B2 | 5/2004 | Miloslavsky | |
| 6,741,586 B1 * | 5/2004 | Schuster et al. | 370/352 |
| 6,757,249 B1 * | 6/2004 | Kejriwal et al. | 370/235.1 |
| 6,845,105 B1 * | 1/2005 | Olsson et al. | 370/469 |
| 6,894,976 B1 * | 5/2005 | Banga et al. | 370/235 |
| 6,904,037 B2 * | 6/2005 | Oran et al. | 370/352 |
| 7,046,643 B1 * | 5/2006 | Zellner et al. | 370/329 |

OTHER PUBLICATIONS i.Picasso Product Sheet, www. congruency.com, 3 pgs., Jun. 20, 2000.

i.Picasso Specifications, www. congruency.com, 2 pgs., Jun. 20, 2000.

* cited by examiner

PACKET PRIORITIZING VOICE OVER PACKET NETWORK PHONE AND SYSTEM

BACKGROUND OF THE INVENTION

1. Field of the Invention

This invention relates generally to Internet telephony and, more particularly, to data packet network telephones.

2. Related Art

Shown in FIG. 1 is a diagrammatic illustration of a typical known communications system where computers 14, 16 are connected by network cables to a packet data network, for example Ethernet backbone 18, and telephones 2, 4, 6 are connected by circuit switched telephone wires to a telephone system 8 and private branch exchange (PBX) 10. Communications involving computers 14, 16 occur by the exchange of data packets through a packet network having many routers, network cables, and optionally public switched telephone network (PSTN) 12. Communications involving telephones 2, 4, 6 occur by establishing a circuit connection between calling and called telephones. Having two separate network systems requires maintaining two systems. Further, since a typical office has at least one computer and one telephone, the associated wiring for each office must be able to support both packet and circuit communications and requires that each office have wiring to support both packet and circuit communications. The complexity in the wiring and the maintenance of two network systems may be great and inefficient.

Recently, voice over packet network (VOPN) phones that use a packet network to send and receive data packets of voice phone calls have been introduced. VOPN technology has simplified the wiring in a typical office such that the same type of network cable may be used for both the computer (e.g., for data processing) and the phone. In a typical office setup, both the VOPN phone and the computer use the same network connection to the data packet network. That is, all data packets to and from the computer and all data packets to and from the VOPN phone are processed by the same network connection. Since data packets to and from the computer are typically much larger than data packets to and from the VOPN phone, processing of the larger data packets may delay the processing of the data packets to and from the VOPN phone. One problem associated with the delay in processing the VOPN data packets is that a user of the VOPN phone may experience poor voice quality. Poor voice quality may be very noticeable to a user of the VOPN phone as echo, talk overlap, pauses or silences in communication. The poor voice quality may make VOPN phone technology unattractive for some users. Further, the poor voice quality may be annoying and frustrating to a user of the VOPN phone. Accordingly, a need exists for a means for processing data packets over a packet network that improves voice quality in a VOPN phone.

SUMMARY

One embodiment of the invention is a method for processing data packets exchanged over a packet network having data packets and voice packets. The method includes receiving data packets from a data processing device and determining whether the data packets need to be divided into smaller data packets. If the data packets need to be divided, then dividing the data packets into divided data packets and interspersing the divided data packets among the voice packets. In addition, the method includes sending the data packets, including the smaller data packets if divided, and the voice packets to a communications network. In one embodiment, data packets to and from the voice packets have a higher priority than the data packets.

Under another embodiment of the invention is a phone system for processing data packets exchanged over a packet network that has data packets and voice packets. The system includes a user interface with the ability to place and receive phone calls that include voice packets. The system also includes a network manager coupled to the user interface, the data processing device and the packet network. The network manager determines whether to divide the data packets and intersperse the divided data packets among the voice packets.

Other systems, methods, features and advantages of the invention will be apparent to one with ordinary skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
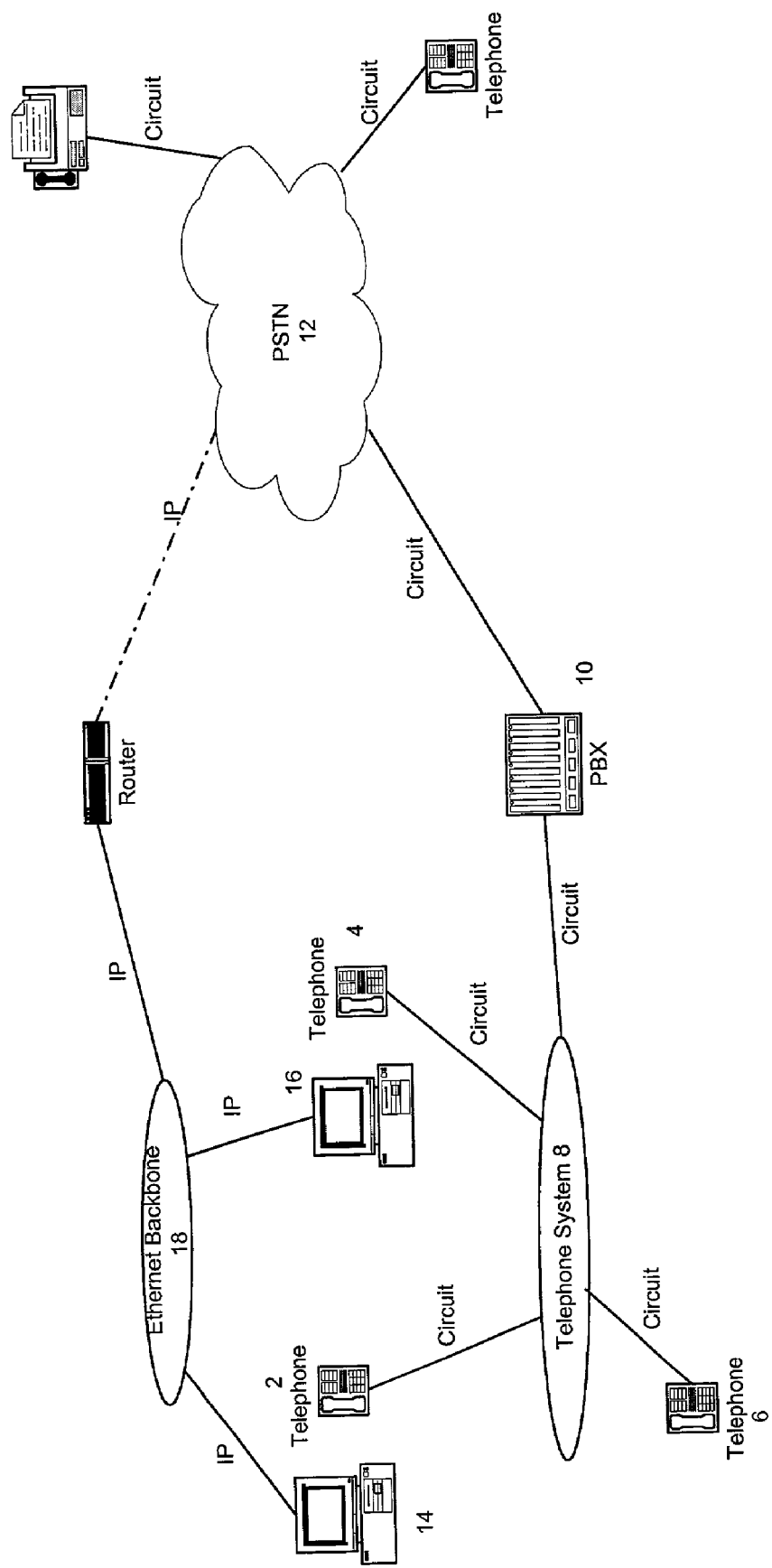
FIG. 1 illustrates a prior art communications system with computers and telephones.
Figure 2:
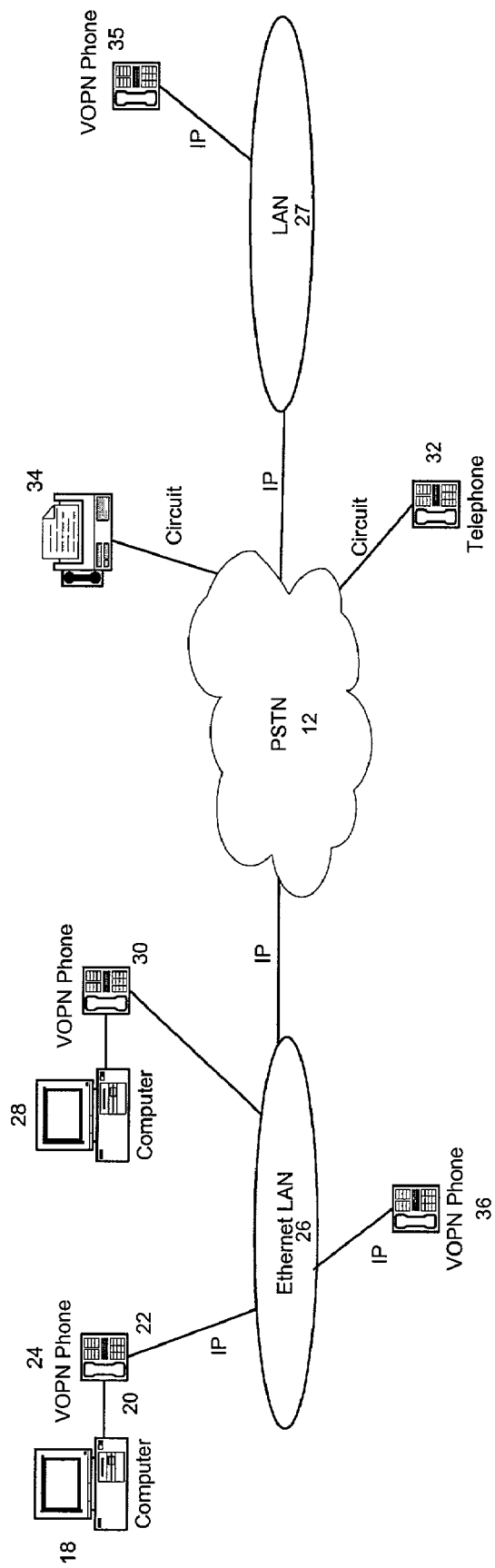
FIG. 2 illustrates a communications system utilizing an embodiment of the invention.

Shown in FIG. 2 is a communications system utilizing a packet network for phone calls and for data transmission. In the illustrated embodiment, a VOPN phone 24 is coupled to a computer 18 by, for example, network cables 20, 22. The computer 18 is connected to an associated VOPN phone 24 and the VOPN phone 24 connects directly to a packet data network, for example Ethernet LAN 26. Further, communications between phones 24, 30, 32, 36 occur via the packet network (e.g. the Ethernet LAN 26 in the illustrated example). For example, in FIG. 2, a phone call between the VOPN phone 24 and the telephone 32 occur utilizing the packet network of The Ethernet LAN 26. Additionally, communications to facsimile machine 34 from either a computer 18, 28 or a VOPN phone 24, 30, 36 may occur utilizing the packet network of The Ethernet LAN 26 and a PSTN 12. Shown in FIG. 2 is a packet network adhering to Internet Protocol (IP) standards. The use of IP is meant to be illustrative and any other packet network (for example, frame relay and Asynchronous Transfer Mode (ATM)) may be used.

In general, a VOPN phone processes packets to and from a packet network and packets to and from a computer to allow a user of the VOPN phone to make and receive phone calls. As shown in FIG. 2, the VOPN phone 24 processes packets received from and sent to the Ethernet LAN 26 and the VOPN phone 24 passes packets received from the computer 18 to the Ethernet LAN 26. When the VOPN phone 24 receives a packet from the Ethernet LAN 26, the VOPN phone 24 determines whether the packet is destined for the VOPN phone 24 or whether it is destined for the computer 18. If a packet is destined for the computer 18, the VOPN phone 24 sends the packet to the computer 18.

Figure 3:
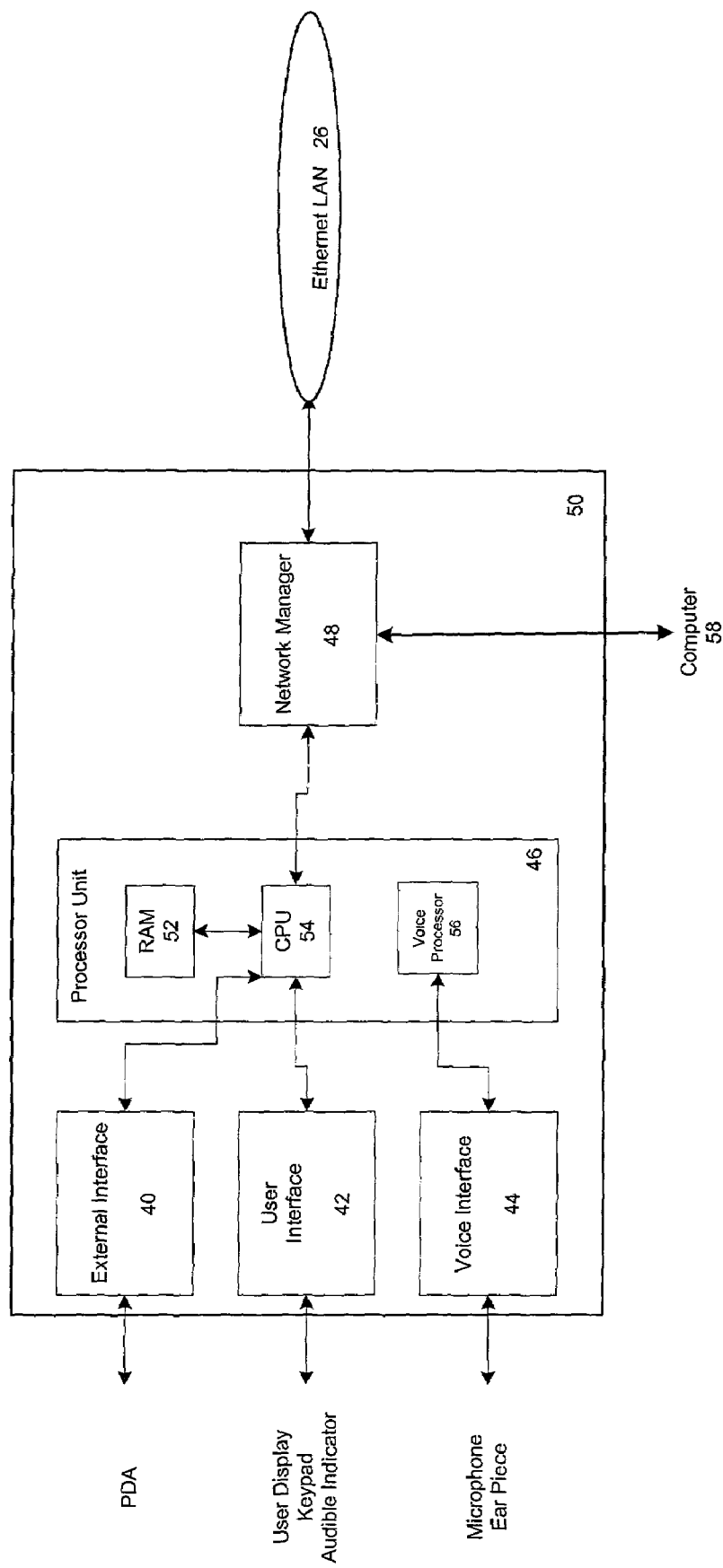
FIG. 3 illustrates a system architecture diagram for an embodiment of the invention.

Referring now to FIG. 3, in order to process packets containing voice, a VOPN phone 50 may, for example, include at least one or more of an external interface 40, user interface 42, voice interface 44, processor unit 46 and network manager 48 for interfacing with data processing devices (e.g., a computer, a personal digital assistant, a cellular telephone, etc.). External interface 40 may provide communication to an external device for example a personal digital assistant (PDA). For example, telephone numbers stored in VOPN phone 50 may be transferred to a PDA via the external interface 40. User interface 42 may provide the conventional user interface functions of a telephone, for example a keypad for dialing numbers, an audible indicator for incoming calls, a display for presenting messages and caller identification information, and additional keys for mute, hold, redial, etc. Voice interface 44 may provide conversion of analog voice into digital samples. Processor unit 46 may perform the voice processing, call processing, and protocol processing functions of the VOPN phone 50. TO perform these functions, processor unit 46 may comprise a central processing unit (CPU) 54, a voice processor 56, and memory, for example RAN 52.

Network manager 48 may manage the transmission and reception of packets from the Ethernet LAN 26 and the computer 58. In an illustrative embodiment of the invention, the network manager 48 breaks up large packets from the computer 58 and large packets destined for the computer 58 into a number of smaller packets. Large packets are defined as packets with a packet size greater than a defined threshold. For example, a packet from the computer 58 or a packet destined for the computer with a packet size of 2500 bytes may be broken up into 5 packets of 500 bytes each. Further, the smaller packets are interspersed among packets directed to and from VOPN phone 50. The network manager 48 generates smaller packets, referenced here as packets a, b, c, d, and e. If the network manager 48 then needs to process packets directed to or from VOPN phone 50, referenced here as f and g, then network manager 48 may reorder processing of the packets to f, a, g, b, c, d, and e. By breaking up large packets to and from the computer 58 and placing the smaller packets among packets to and from VOPN phone 50, packets to and from VOPN phone 50 are processed more quickly.

In an alternative embodiment of the present invention, the network manager 48 may place a higher priority on packets to and from the VOPN phone 50 over packets to and from the computer 58. Higher priority means to process packets to and from the VOPN phone 50 before packets to and from the computer 58. In the above example, packets f and g are processed before a, b, c, d, and e. Further, if while the network manager 48 is processing packet a, the network manager 48 receives packets f and g, then packets f g are processed after packet a and before packets b, c, d, and e. By placing a higher priority on the packets to and from the VOPN phone 50, the packets to and from the VOPN phone 50 are more quickly processed than in prior art systems.

The network manager 48 may implement schemes to allow the user of a VOPN phone to place higher emphasis on computer packets than on VOPN packets. For example, if a user of the VOPN phone 50 decides not to place higher priority on packets to the and from the VOPN phone 50 then the network manager 48 may implement a priority scheme to allow data packets to and from the computer 58 to be processed with a higher priority. In yet another embodiment, the network manager 48 may implement varying levels of priority on all the packets it processes. For example, the network manager 48 may implement a four level priority scheme where each data packet is assigned one of four priority levels. The four priority levels may be described as highest, high, medium, and low where all data packets assigned the highest priority are processed before those that are assigned high priority. Thus, a packet to and from the computer 58 which is assigned the highest priority may be processed before a packet to and from the VOPN phone 50 which is assigned a high priority while packets to and from the computer 58 are normally assigned a medium priority.

In an illustrative embodiment of the present invention, the network manager 48 may adhere to 10BaseT or 100BaseT Ethernet running TCP/IP protocols. Further, the network manager 48 may include two Ethernet transceivers. One transceiver may be used to interface to the communications network and the other transceiver may be used to interface to a data processing device, for example the computer 58. In another embodiment, the network manager 48 may comprise one transceiver that functions to interface to both the communications network and a data processing device, for example the computer 58. Although the use of 10BaseT and 100BaseT Ethernet is mentioned, such protocols are illustrative and any alternative networking protocol may be utilized.

As an example of the use of the communications system of FIG. 2, when a user (as used herein, "caller") of VOPN phone 24 wishes to communicate with another phone user, the caller may place a call on the VOPN phone 24. The call is placed and connected through The Ethernet LAN 26 to the receiving user (as used herein, "called user"). It is important to note that the called user may not be using a VOPN phone or may not even be connected to a packet network, for example the Ethernet LAN 26. As shown in FIG. 2, the called user may be using a telephone 32 connected to the PSTN 12. Further, the called user may be associated with telephonic devices connected to packet networks, or to circuit switch networks, for example the facsimile 34 in FIG. 2.

The VOPN phone 24 sends and receives data packets containing voice (as used herein, "voice packets") to the Ethernet LAN 26. An illustrative embodiment of the invention places a higher priority on voice packets than on non-voice packets. Higher priority means to process voice packets before non-voice packets. By processing voice packets before non-voice packets, quality of service may be improved by reducing the delay associated with processing voice packets.

Further, another illustrative embodiment of the invention breaks up large non-voice packets and places a higher priority on voice packets than on non-voice packets. The VOPN phone 24 may check the size of non-voice packets received from either the computer 18 or from The Ethernet LAN 26. When the VOPN phone 24 receives a packet, it may first be checked to see if it is a voice packet. If it is, then the voice packet may immediately be processed. If it is not a voice packet, then the VOPN phone 24 may determine the size of the non-voice packet. If the non-voice packet is larger than a defined threshold, then, in one embodiment, the VOPN phone 24 divides the larger non-voice packet into smaller non-voice packets. The smaller non-voice packets may be uniformly broken up or the non-voice packets may be randomly broken up. For example, a non-voice packet of 2500 bytes may be broken up into 5 non-voice packets of 500 bytes each. These 5 non-voice packets may be interspersed among voice packets so that voice quality may not degrade from having to process large non-voice packets. In another example, a non-voice packet of 2500 bytes may be broken up into 6 non-voice packets of 400, 350, 550, 600, 225 and 375 byte non-voice packets.

In operation, an embodiment of the present invention may process data packets exchanged over a packet network by (a) receiving data packets from a data processing device, (b) determining whether the data packets need to be divided into smaller data packets, dividing the data packets into divided data packets if determined to be needed and interspersing the divided data packets among the voice packets, and (c) sending the data packets, including the smaller data packets if divided, and the voice packets to a communications network.

While various embodiments of the invention have been described, it will be apparent to those of ordinary skill in the art that many more embodiments and implementations are possible that are within the scope of this invention.

What is claimed is:

1. A method used within a voice over packet network telephone for processing packets exchanged over a packet network having data packets and voice packets comprising the steps of:

receiving data packets from the packet network and from a plurality of data processing devices including a computer coupled to the packet network telephones and communicating to the packet network through the packet network telephone;

assigning a first predetermined priority level to the voice packets, a second user selected predetermined priority level to data packets from the computer of the plurality of data processing devices and a third user selected predetermined priority level to data packets from a second data processing device of the plurality of data processing devices where the first, second and third predetermined priority levels are all different;

determining whether a received data packet from the packet network is destined for the computer or for the packet network telephone;

determining whether the data packets from or destined to the computer need to be divided into smaller data packets, dividing into divided data packets each data packet determined to need dividing and interspersing the divided data packets among the voice packets; and sending the data packets, including the smaller data packets if divided, and the voice packets to and from the packet network and the computer based upon the respective priorities of each voice packet and each data packet on a packet by packet basis.

2. The method of claim 1 wherein the step of determining further comprises comparing the data packets to a size threshold and determining that the data packets are to be divided if the data packets are larger than the size threshold.

3. The method of claim 1 wherein the divided data packets are of equal size.

4. The method of claim 1 wherein the data packets determined to need dividing are randomly divided into random, non-uniform size smaller packets.

5. The method of claim 1 wherein the first and second data processing device further comprise devices selected from the group consisting of a computer, a laptop computer, a personal digital assistant, or a cellular telephone.

6. The method of claim 1 wherein the voice packets have a higher priority than the data packets from the data processing device.

7. The method of claim 6 wherein the higher priority voice packets are processed before the data packets.

8. The method of claim 1 wherein each data packet and each voice packet is assigned a priority corresponding to the order in which the packet is processed.

9. The method of claim 1 wherein at least one of the data packet priorities is a higher priority than the voice packet priority and higher priority data packets are processed before the voice packets.

10. The method of claim 1 wherein the communications network comprises one of a frame relay network, Asynchronous Transfer Mode network, and Internet Protocol network.

11. The method of claim 1 wherein the communication network adheres to Ethernet protocols.

12. The method of claim 1 wherein the voice packets are exchanged over the packet network by a first Ethernet transceiver and data packets are exchanged with the first data processing device using a second transceiver.

13. The method of claim 1 wherein selected data packets exchanged with the first data processing device are assigned a higher priority than the voice packets, and all remaining data packets exchanged with the first data processing device are assigned a lower priority than the voice packets.

14. The method of claim 1 wherein the step of receiving and the step of sending is performed by the same Ethernet transceiver.

15. A method used within a voice over packet network telephone for processing data packets exchanged over a packet network having data packets and voice packets comprising the steps of:

receiving data packets from a plurality of data processing devices;

assigning a first predetermined priority level to packets to and from the network telephone, a user selected second predetermined priority level to data packets from a first data processing device of the plurality of data processing devices and a user selected third predetermined priority level to data packets from a second data processing device of the plurality of data processing devices, where the first, second and third predetermined priority levels are all different;

determining whether the data packets need to be divided into smaller data packets, dividing the data packets into divided data packets if determined to be needed and interspersing the divided data packets among the voice packets;

assigning a higher priority to the packets to and from the network telephone, including the smaller data packets if divided; and sending the data packets, including the smaller data packets if divided, and the voice packets to a communications network based upon the respective priorities of each voice packet and data packet on a packet by packet basis and the voice over packet network telephone determining whether data packets are destined for any data processing device coupled directly to the voice over packet network telephone and not otherwise connected to the communication network and if destined for the data processing device, sending the data packet directly to the data processing device.

16. The method of claim 15 wherein the step of determining further comprises comparing the data packets to a size threshold and determining that the data packets are to be divided if the data packets are larger than the size threshold.

17. The method of claim 15 wherein the first and second data processing device further comprise one of the group consisting of a computer, a laptop computer, a personal digital assistant, and a cellular telephone.

18. The method of claim 15 wherein the communications network comprises one of a frame relay network, Asynchronous Transfer Mode network, and Internet Protocol network.

19. The method of claim 15 wherein the communications network adheres to Ethernet protocols.

20. A method used within a voice over packet network telephone for processing data packets exchanged over a packet network having data packets and voice packets comprising the steps of:
- receiving data packets from a communications network;
- separating the data packets from the communications network into data packets destined for a phone and data packets destined for a first or a second data processing device interconnected with the packet network through the phone; and
- assigning a higher predetermined priority to the data packets destined for the phone and user selected first and second lower predetermined priorities to data packets destined for the first and second data processing devices, where the higher priority of the phone and the first and second lower priorities for the first and second data processing devices are all different and transmitting the data packets based upon the respective priority of each data packet on a packet by packet basis.

21. The method of claim 20 further comprising the step of determining whether the data packets not destined for the phone need to be divided into smaller data packets not destined for the phone, dividing the data packets not destined for the phone into divided data packets not destined for the phone if determined to be needed and interspersing the divided data packets not destined for the phone among the data packets destined for the phone.

22. The method of claim 21 wherein the step of determining further comprises comparing the data packets not destined for the phone to a size threshold and determining that the data packets not destined for the phone are to be divided if the data packets not destined for the phone are larger than the size threshold.

23. The method of claim 21 wherein the divided data packets are of unequal size.

24. The method of claim 21 wherein the divided data packets are of equal size.

25. The method of claim 20 wherein the data packets destined for the phone have a higher priority than the data packets not destined for the phone.

26. The method of claim 25 wherein the higher priority data packets destined for the phone are processed before the data packets not destined for the phone.

27. The method of claim 20 wherein each data packet destined for the phone and each data packet not destined for the phone is assigned a priority corresponding to the order in which the data packet is processed.

28. The method of claim 20 wherein the communications network comprises one of a frame relay network, Asynchronous Transfer Mode network, and Internet Protocol network.

29. The method of claim 20 wherein the communications network adheres to Ethernet protocols.

30. The method of claim 20 wherein the step of receiving is performed by an Ethernet transceiver.

31. A method used within a voice over packet network telephone for processing data packets exchanged over a packet network comprising the steps of:
- receiving data packets from a communications network;
- separating the data packets from the communications network into data packets destined for the voice over packet network telephone and data packets not destined for the telephone and, instead, are destined for a plurality of data processing devices interconnected with the packet network through the phone;
- assigning a first predetermined priority level to the voice packets, a user selected second predetermined priority level to data packets from a first data processing device of the plurality of data processing devices and a user selected third predetermined priority level to data packets from a second data processing device of the plurality of data processing devices where the first, second and third priority levels are all different;
- determining whether the data packets not destined for the phone need to be divided into smaller data packets not destined for the phone, dividing the data packets not destined for the phone into divided data packets not destined for the phone if determined to be needed and interspersing the divided data packets not destined for the phone among the data packets destined for the phone; and
- sending the data packets not destined for the phone including the smaller data packets if divided, to the first and second data processing device based upon the respective priorities of each voice packet and each data packet on a packet by packet basis.

32. The method of claim 31 wherein the data packets destined for the phone have a higher priority than data packets not destined for the phone.

33. The method of claim 31 wherein the communications network comprises a packet network including frame relay, Asynchronous Transfer Mode, and transport over Internet Protocol.

34. The method of claim 31 wherein the communications network adheres to Ethernet protocols.

35. The method of claim 31 wherein the step of receiving is performed by an Ethernet transceiver.

36. A method used within a voice over packet network telephone for processing data packets exchanged over a packet network having data packets and voice packets comprising the steps of:
- receiving data packets from a plurality of data processing devices;
- assigning a first predetermined priority level to the voice packets, a second user selected predetermined priority level to data packets associated with a first data processing device of the plurality of data processing devices and a third user selected predetermined priority level to data packets associated with a second data processing device of the plurality of data processing devices, where the first priority level has a higher relative value than the second and third priorities and where the first, second and third priority levels are all different;
- determining whether the data packets from the plurality of data processing devices need to be divided into smaller data packets from the data processing devices, dividing the data packets from the data processing devices into divided data packets from the data processing devices if determined to be needed and
- interspersing the divided data packets from the data processing device among the voice packets;
- sending the data packets from the data processing device, including the smaller data packets from the data processing device if divided, and the voice packets to a communications network based upon the respective priorities of the voice packets and the data packets;
- receiving data packets from the communications network;
- separating the data packets from the communications network into voice packets and data packets not destined for a phone;
- determining whether the data packets not destined for the phone need to be divided into smaller data packets not destined for the phone, dividing the data packets not destined for the phone into divided data packets not destined for the phone if determined to be needed and interspersing the divided data packets not destined for the phone among the voice packets; and sending the data packets not destined for the phone including the smaller data packets if divided, to the data processing devices based upon the respective priorities of each data packet on a packet by packet basis.

37. The method of claim 36 wherein the divided data packets are of unequal size.

38. The method of claim 36 wherein the first and second data processing devices further comprise one of the group consisting of a computer, a laptop computer, a personal digital assistant, and a cellular telephone.

39. The method of claim 36 wherein the higher priority voice packets are processed before the data packets.

40. The method of claim 36 wherein the communications network comprises one of a frame relay network, Asynchronous Transfer Mode network, and Internet Protocol network.

41. The method of claim 36 wherein the communications network adheres to Ethernet protocols.

42. The method of claim 36 wherein the step of receiving the data packets from a data processing is device performed by a first Ethernet transceiver.

43. The method of claim 36 wherein the step of sending data packets from the data processing device, including the smaller data packets from the data processing device if divided, and the voice packets to a communications network is performed by a second Ethernet transceiver.

44. A voice over packet network telephone for processing data packets exchanged over a packet network having data packets to and from a plurality of data processing devices including a computer and voice packets to and from the voice over packet network telephone comprising:
    a user interface within the voice over packet network telephone with the ability to place and receive phone calls comprising voice packets over the packet network;
    a computer input for connection to the computer, the computer communicating to the packet network through the packet network telephone; and
    a network manager within the voice over packet network telephone coupled to the user interface, the data processing devices and the packet network, and adapted to determine whether a received data packet is destined for the computer or is from the computer and to process voice and data packets based upon use of a first predetermined priority for the voice packets, a user selected second predetermined priority for the computer of the plurality of data processing devices and a user selected third predetermined priority for a second data processing device of the plurality of data processing devices where the first, second and third priorities are all different and whereby the network manager determines whether to divide the data packets to and from the computer and intersperse the divided data packets among the voice packets based upon the relative priorities of each voice packet and data packet on a packet by packet basis and sends the divided data packets to the computer and the network.

45. The system of claim 44 further comprising a voice interface that performs conversion between analog voice and digital voice samples.

46. The system of claim 44 further comprising a processor unit to perform voice processing, call processing, and protocol processing functions of the phone system.

47. The system of claim 44 further comprising an external interface to communicate with a peripheral device comprising one of a personal digital assistant, a cellular telephone, and a laptop computer.

48. The system of claim 44 wherein the first and second data processing device comprises one of the group consisting of a computer, a laptop computer, a personal digital assistant, and a cellular telephone.

49. The system of claim 44 wherein the network manager places a higher priority on voice packets than on data packets.

50. The system of claim 49 wherein the higher priority voice packets are processed by the network manager before the data packets.

51. The system of claim 44 wherein the network manager compares the size of data packets to a size threshold and divides data packets that are larger than the size threshold.

52. The system of claim 44 wherein the network manager randomly divides the data packets into random, unequal size divided data packets.

53. The system of claim 44 wherein the network manager assigns a higher priority than the voice packets to selected data packets exchanged with the first data processing device and assigns a lower priority than the voice packets to all remaining data packets exchanged with the first data processing device.

54. The system of claim 44 wherein the packet network adheres to Internet protocols.

55. The system of claim 44 wherein the network manager prioritizes data packets and voice packets into various priority levels.

56. A voice over packet network telephone for processing data packets exchanged over a packet network having data packets to and from a plurality of data processing devices and voice packets to and from the voice over packet network telephone comprising:
    a user interface within the voice over packet network telephone with the ability to place and receive phone calls comprising voice packets; and
    a network manager within the voice over packet network telephone coupled to the user interface, the data processing device and the packet network adapted to process voice and data packets based upon use of a first predetermined priority level for the voice packets, a second user selected predetermined priority level for a first data processing device of the plurality of data processing devices and a third user selected predetermined priority level for a second data processing device of the plurality of data processing devices where the first, second and third priority levels are all different and whereby the network manager determines whether to divide the data packets, intersperse the divided data packets among the voice packets, and place a higher priority on the voice packets than on the divided data packets, if determined to be needed based upon the relative priority levels of each voice and each data packet on a packet by packet basis.

57. A voice over packet network telephone for processing voice packets and data packets over a packet network comprising:
    means within the voice over packet network telephone for receiving data packets from a plurality of data processing devices where the voice packets have a first predetermined priority, data packets from a first data processing device of the plurality of data processing devices have a second user selected predetermined priority and data packets from a second data processing device of the plurality of data processing devices have a third user selected predetermined priority and where the first, second and third priorities are all different;
    means within the voice over packet network telephone for determining whether the data packets need to be divided into smaller data packets, dividing the data packets into divided data packets if determined to be needed and interspersing the divided data packets among voice packets; and means within the voice over packet network telephone for sending the data packets, including the smaller data packets if divided, and the voice packets to a communications network based upon the relative priorities of each voice and each data packet on a packet by packet basis.

58. A voice over packet network telephone for processing data packets over a packet network comprising:

the voice over packet network telephone receiving data packets from a communications network;

the voice over packet network telephone separating the data packets from the communications network into data packets destined for a phone and data packets not destined for the phone, said data packets not destined for the phone, instead, being destined to one of a plurality of data processing devices;

the voice over packet network telephone providing a first predetermined priority for data packets destined for the phone and from the phone, a second user selected predetermined priority for data packets destined for a first data processing device of the plurality of data processing devices and a third user selected predetermined priority for data packets destined for a second data processing device of the plurality of data processing devices;

the voice over packet network telephone assigning a higher priority to the data packets destined for the phone and from the phone; and the voice over packet network telephone distributing the data packets based upon the respective priorities of each data packet on a packet by packet basis.

59. A voice over packet network telephone for processing data packets over a packet network comprising:

means within the voice over packet network telephone for receiving data packets from a plurality of data processing devices;

means within the voice over packet network telephone for determining whether the data packets from the data processing devices need to be divided into smaller data packets from the data processing devices, dividing the data packets from the data processing devices into divided data packets from the data processing devices if determined to be needed and interspersing the divided data packets from the data processing devices among voice packets;

means within the voice over packet network telephone for assigning a predetermined priority to the voice packets, a first user selected higher predetermined order of priority to data packets to and from the first data processing device and a second user selected lower predetermined order of priority to data packets from the second data processing device wherein the lower order of priority is different from the predetermined priority;

means within the voice over packet network telephone for sending the data packets from the data processing devices, including the smaller data packets from the data processing devices if divided, and the voice packets to a communications network based upon the relative priorities of the voice and data packets;

means within the voice over packet network telephone for receiving data packets from the communications network;

means within the voice over packet network telephone for separating the data packets from the communications network into voice packets and data packets not destined for a phone;

means within the voice over packet network telephone for determining whether the data packets not destined for the phone need to be divided into smaller data packets not destined for the phone; dividing the data packets not destined for the phone into divided data packets not destined for the phone if determined to be needed and interspersing the divided data packets not destined for the phone among the voice packets; and means within the voice over packet network telephone for sending the data packets destined for the phone and not destined for the phone including the smaller data packets if divided, to the phone and data processing devices based upon the relative priorities of each data packet on a packet by packet basis.

* * * * *